(12) United States Patent
Sugimoto et al.

(10) Patent No.: US 9,005,820 B2
(45) Date of Patent: Apr. 14, 2015

(54) LITHIUM SECONDARY BATTERY USING IONIC LIQUID

(75) Inventors: Toshinori Sugimoto, Kyoto (JP); Eriko Ishiko, Kyoto (JP); Tetsuya Higashizaki, Kyoto (JP); Michiyuki Kono, Kyoto (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 12/796,230

(22) Filed: Jun. 8, 2010

(65) Prior Publication Data

US 2011/0081583 A1    Apr. 7, 2011

(30) Foreign Application Priority Data

Jun. 10, 2009  (JP) ................................ 2009-139074

(51) Int. Cl.
| | |
|---|---|
| *H01M 2/16* | (2006.01) |
| *H01M 10/052* | (2010.01) |
| *H01M 2/14* | (2006.01) |
| *H01M 2/18* | (2006.01) |
| *H01M 6/16* | (2006.01) |
| *H01M 10/0569* | (2010.01) |
| *H01M 10/42* | (2006.01) |

(52) U.S. Cl.
CPC ............ *H01M 10/052* (2013.01); *H01M 2/145* (2013.01); *H01M 2/1606* (2013.01); *H01M 2/1633* (2013.01); *H01M 2/18* (2013.01); *H01M 6/164* (2013.01); *H01M 10/0569* (2013.01); *H01M 10/4235* (2013.01); *H01M 2300/0034* (2013.01); *H01M 2300/0045* (2013.01); *Y02E 60/122* (2013.01)

(58) Field of Classification Search
CPC .................................................. H01M 2/1633
USPC ................................................. 429/121–347
See application file for complete search history.

(56) References Cited

U.S. PATENT DOCUMENTS

| 6,200,706 | B1 * | 3/2001 | Ashida et al. ................. 429/249 |
| 2003/0137798 | A1 * | 7/2003 | Kawasato et al. ............. 361/505 |
| 2003/0180622 | A1 | 9/2003 | Tsukuda et al. |
| 2005/0244716 | A1 * | 11/2005 | Ogawa et al. ................. 429/247 |
| 2005/0277026 | A1 | 12/2005 | Nishikawa et al. |
| 2008/0014506 | A1 | 1/2008 | Sugiyama et al. |
| 2009/0081534 | A1 | 3/2009 | Takami et al. |
| 2009/0123823 | A1 * | 5/2009 | Ando et al. ................... 429/129 |

FOREIGN PATENT DOCUMENTS

| CN | 101005129 A | 7/2007 |
| CN | 101399370 A | 4/2009 |
| EP | 0834936 A1 | 3/1996 |
| EP | 1816258 A1 | 11/2005 |
| EP | 2166611 A1 | 4/2008 |
| EP | 2224514 A1 | 9/2010 |
| JP | 2004-296325 A | 10/2004 |
| JP | 2007207675 A | 8/2007 |
| JP | 2007311333 A | 11/2007 |
| JP | 2009-26542 A | 2/2009 |
| JP | 2009-76486 A | 4/2009 |
| WO | 01/93350 A1 | 6/2001 |
| WO | WO-2008/133207 A1 | 3/2009 |

OTHER PUBLICATIONS

Office Action dated Oct. 4, 2011, from European Patent Office in corresponding European Application No. 10165559.5.
Office Action dated Jun. 21, 2012, from Chinese Patent Office in corresponding Chinese Application No. 201010199316.X.
Notification of Reasons of Refusal issued in Japanese priority patent application No. 2009-139074 with English translation.
Office Action dated Nov. 14, 2013 regarding Chinese patent application No. 201010199316.X with English Translation.

* cited by examiner

*Primary Examiner* — Kenneth Douyette
*Assistant Examiner* — James Lee
(74) *Attorney, Agent, or Firm* — Roylance, Abrams, Berdo & Goodman, L.L.P.

(57) ABSTRACT

The lithium secondary battery of the present invention is a lithium secondary battery including a positive electrode, a negative electrode, a separator provided between the positive electrode and the negative electrode, and a non-aqueous electrolyte containing a lithium salt, wherein the non-aqueous electrolyte includes, as a solvent, an ionic liquid containing a bis(fluorosulfonyl)imide anion as an anion component; and the separator is a nonwoven fabric comprising at least one member selected from an organic fiber and a glass fiber and has a porosity of 70% or more.

6 Claims, No Drawings

LITHIUM SECONDARY BATTERY USING IONIC LIQUID

BACKGROUND OF THE INVENTION

1. Field of the Invention

The present invention relates to a lithium secondary battery using an ionic liquid. In more detail, the present invention relates to a lithium secondary battery using an ionic liquid having a bis(fluorosulfonyl)imide anion.

2. Brief Description of the Background Art

Lithium secondary batteries are a small-sized, light-weight rechargeable battery; have a large storage capacity per unit volume or unit weight; and are widely utilized for a mobile phone, a laptop personal computer, a personal digital assistant (PDA), a video camera, a digital camera and the like, and they become absolutely indispensable for various small-sized, light-weight portable devices with relatively large powder consumption. Also, in recent years, middle-sized or large-sized lithium batteries to be mounted in electrically power assisted bicycles or electric vehicles have been developed, and the development is hoped as a measure for making them environmentally friendly.

Polar aprotic organic solvents which are easy to dissolve a lithium salt therein and are hardly electrolyzed have been used as a non-aqueous solvent which is used for a non-aqueous electrolyte of lithium secondary batteries. However, since those organic solvents have a very low flash point, they involve a serious problem regarding safety of a battery such as ignition and explosion to be caused due to generation of heat at the time of overcharge or at the time of short circuit. In particular, in recent years, following downsizing or weight reduction of electronic devices or development of electric vehicles, development of lithium secondary batteries with large capacity and high output is a pressing need, and security of safety becomes an important problem to be solved more and more. For that reason, various investigations are made regarding the use of an ionic liquid as a flame-retardant compound for a non-aqueous electrolyte of lithium secondary batteries.

Above all, an ionic liquid containing a bis(fluorosulfonyl)imide anion (FSI anion) as an anion component has a low viscosity in comparison with other ionic liquids, and the use of the ionic liquid makes it possible to provide a lithium battery having high performance at the time of high-rate charging and discharging, high energy density and high voltage and having high safety due to use of a nonflammable ionic liquid for a solvent of non-aqueous electrolytes (see Patent Document 1).

However, in comparison with batteries using an organic solvent, lithium batteries using a combination of a usual graphitized carbon electrode and an ionic liquid have high internal resistance, poor output performance and low cycle life performance which is caused due to deposition of lithium and decomposition products on the negative electrode surface, and it is the present situation that the lithium batteries do not reach a practical useful level in performance.

For that reason, it is demanded for the liquid secondary batteries using a flame-retardant ionic liquid to be enhanced in battery performance through development of new battery constituent materials or investigations on additives.

RELATED-ART TECHNICAL DOCUMENTS

[Patent Document 1] JP-A-2007-207675

SUMMARY OF THE INVENTION

In view of the foregoing problems, for the purpose of enhancing the safety which is strongly required for lithium secondary batteries, an object of the present invention is to provide a flame-retardant lithium secondary battery having excellent battery performance and high safety in comparison with existent batteries by selection and search of battery constituent materials.

In view of the foregoing, the present invention has been made. The lithium secondary battery of the present invention is a lithium secondary battery comprising a positive electrode, a negative electrode, a separator provided between the positive electrode and the negative electrode, and a non-aqueous electrolyte containing a lithium salt, wherein the non-aqueous electrolyte includes, as a solvent, an ionic liquid containing a bis(fluorosulfonyl)imide anion as an anion component; and the separator is a nonwoven fabric compising at least one member selected from an organic fiber and a glass fiber and has a porosity of 70% or more.

In the foregoing lithium secondary battery, the separator preferably has an air permeability obtained by the Gurley test method of 200 sec/100 cc or less.

Additionally, in the foregoing lithium secondary battery, the separator has preferably has the porosity of 80% or more and 95% or less, and it is more preferable that the separator is a wet-type sheet having a porosity of 85% or more which is made in paper-making process; and comprises 80% by mass or more of a glass fiber having a mean fiber diameter of 1 μm or less and less than 20% by mass of an organic component including a fibrillated organic fiber, wherein the glass fibers are bound to each other through entanglement of the fibrillated organic fiber.

DETAILED DESCRIPTION OF THE INVENTION

The lithium secondary battery according to the present invention comprises a positive electrode, a negative electrode, a separated provided between the positive electrode and the negative electrode and partitioning the both electrodes from each other, and a non-aqueous electrolyte wherein a lithium salt was dissolved in a solvent for conducting a lithium ion as a supporting electrolyte.

Each of the positive electrode and the negative electrode which are used in the present invention comprises an active material, a conductive agent, a current collector of an active material, and a binder for binding the active material and the conductive agent to the current collector.

A positive active material which is used for the positive electrode of the present invention is not particularly limited as long as it is capable of intercalating/deintercalating a lithium ion. Examples thereof include metal oxides such as $CuO$, $Cu_2O$, $MnO_2$, $MoO_3$, $V_2O_5$, $CrO_3$, $MoO_3$, $Fe_2O_3$, $Ni_2O_3$ and $CoO_3$; complex oxides of lithium and a transition metal, such as $Li_xCoO_2$, $Li_xNiO_2$, $Li_xMn_2O_4$ and $LiFePO_4$; metal chalcogenides such as $TiS_2$, $MoS_2$ and $NbSe_3$; and conductive polymer compounds such as polyacene, poly(p-phenylene), polypyrrole and polyaniline.

Among the foregoing, complex oxides of at least one member selected from transition metals such as cobalt, nickel and manganese and lithium, which are generally called a high-voltage system, are preferable from the standpoints of a deintercalating property of a lithium ion and easiness in obtaining a high voltage. Specific examples of complex oxides of cobalt, nickel and/or manganese and lithium include $LiCoO_2$, $LiMnO_2$, $LiMn_2O_4$, $LiNiO_2$, $LiNi_xCo_{(1-x)}O_2$ and $LiMn_aNi_bCO_c$ ($a+b+c=1$, $0<x<1$).

Also, materials obtained by daubing such a lithium complex oxide with a small amount of an element such as fluorine, boron, aluminum, chromium, zirconium, molybdenum and iron; and materials obtained by subjecting the surface of a lithium complex oxide particle to a surface treatment with carbon, MgO, $Al_2O_3$, $SiO_2$ or the like can be used.

The positive active material can be used in combinations of two or more kinds thereof.

As negative active material which is used for the negative electrode of the present invention, known active materials can be used without particular limitations as long as it is capable of intercalating/deintercalating metallic lithium or a lithium ion. For example, carbon materials such natural graphite, artificial graphite, hardly graphitized carbon and easily graphitized carbon can be used. Also, metal materials such as metallic lithium, alloys, alloy composites and tin compounds, lithium transition metal nitrides, crystalline metal oxides, amorphous metal oxides, silicon compounds, conductive polymers and the like can be used. Specific examples thereof include $Li_4Ti_5O_{12}$.

A conductive agent is used for each of the positive electrode and the negative electrode. As the conductive agent, electron conductive materials can be used as long as they do not have adverse effect on the battery performance. In general, although carbon blacks such as acetylene black and ketjen black can be used as the conductive agent, a conductive material such as natural graphite (for example, scaly graphite, flaky graphite, amorphous graphite, etc.), artificial graphite, a carbon whisker, a carbon fiber, a metal (for example, copper, nickel, aluminum, silver, gold, etc.) powder, a metal fiber and a conductive ceramics material may be used. Those materials can be contained as a mixture of two or more kinds thereof. An addition amount thereof is preferably from 1 to 30% by weight, and especially preferably from 2 to 20% by weight relative to the amount of the active material.

As a current collector of the active material, any material can be used as long as it is an electron conductor which does not have adverse effect on the constituted battery. For example, as a current collector for the positive electrode, in addition to aluminum, titanium, stainless steel, nickel, baked carbon, conductive polymers, conductive glass and the like, materials obtained by treating the surface of aluminum, copper or the like with carbon, nickel, titanium, silver or the like for the purpose of enhancing adhesiveness, conductivity or oxidation resistance can be used. Also, as a current collector for the negative electrode, in addition to copper, stainless steel, nickel, aluminum, titanium, baked carbon, conductive polymers, conductive glass, Al—Cd alloys and the like, materials obtained by treating the surface of copper or the like with carbon, nickel, titanium, silver or the like for the purpose of enhancing adhesiveness, conductivity or oxidation resistance can be used.

In such a current collector material, it is also possible to subject its surface to an oxidation treatment. Also, with respect to its form, not only a foil form but a film form, a sheet form, a network form, a punched or expanded material, and molded articles such as a lath material, a porous material and a foamed material are useful. Although its thickness is not particularly limited, materials having a thickness of from 1 to 100 μm are usually used.

Examples of a binder for binding the active material to the positive electrode or the negative electrode include polyvinylidene fluoride (PVDF); PVDF copolymer resins such as copolymers of PVDF with hexafluoropropylene (HFP), perfluoromethyl vinyl ether (PFMV) or tetrafluoroethylene (TFE); fluorine based resins such as polytetrafluoroethylene (PTFE) and fluorocarbon rubbers; a styrene-butadiene rubber (SBR); an ethylene-propylene rubber (EPDM); and polymers such as a styrene-acrylonitrile copolymer. Polysaccharides such as carboxymethyl cellulose (CMC), thermoplastic resins such as polyimide resins and the like can be used jointly.

However, it should not be construed that the present invention is limited thereto. Also, those materials may be used in admixture of two or more kinds thereof. An addition amount of the binder is preferably from 1 to 30% by weight, and especially preferably from 2 to 20% by weight relative to the amount of the active material. Also, an amount of the active material to be bound to each of the positive electrode and the negative electrode varies depending upon an application thereof or the like and is not particularly limited. In general, the amount of the positive active material is from about 3 to 10 mg/cm$^2$; and the amount of the negative active material is from about 1 to 5 mg/cm$^2$.

Each of the electrodes which are used in the present invention can be produced by coating a coating liquid comprising the active material, conductive agent and binder and the like on the current collector.

Next, an ionic liquid containing a bis(fluorosulfonyl)imide anion (FSI anion) as an anion component is used for the non-aqueous electrolyte of the lithium secondary battery of the present invention. Since the electrolyte using such an ionic liquid is nonflammable, the obtained lithium secondary battery is excellent in safety. Also, a battery having high performance even at the time of high-rate charging and discharging, high energy density and high voltage is obtained.

A method for preparing the FSI anion is not particularly limited, and known methods such as a reaction between fluorosulfonic acid and urea can be used. FSI compounds obtained by those methods generally have low purity. Therefore, in order to obtain a preferable ionic liquid containing 10 ppm or less of impurities, the FSI compounds are appropriately purified with water, an organic solvent or the like and used. The impurities can be confirmed through analysis using a plasma emission spectrometer (ICP).

Also, the anion component which is contained in the ionic liquid may contain an anion other the FSI anion. Examples thereof include $BF_4^-$, $PF_6^-$, $SbF_6^-$, $NO_3^-$, $CF_3SO_3^-$, $(CF_3SO_2)_2N^-$ (bis(trifluorimethanesulfonyl)imide anion; hereafter referred to as "TFSI"), $(C_2F_5SO_2)_2N^-$, $(CF_3SO_2)_3C^-$, $CF_3CO_2^-$, $C_3F_7CO_2^-$, $CH_3CO_2^-$ and $(CN)_2N^-$. Two or more kinds of those anions may be contained.

In the ionic liquid which is contained in the lithium secondary battery of the present invention, a cation structure which is combined with the FSI anion is not particularly limited, and a combination with a cation capable of forming an ionic liquid having a melting point of 50° C. or less is preferable. When the melting point exceeds 50° C., the viscosity of the non-aqueous electrolyte is increased. As a result, a problem arises in cycle life performance of the lithium secondary battery, and a discharge capacity tends to be decreased, and therefore, which is not preferable.

As the cation, a compound containing any one of N, P, S, O, C or Si, or two or more kinds of those elements in a structure thereof and having a chain structure or a cyclic structure such as a 5-membered ring and a 6-membered ring in a skeleton thereof is used.

Examples of the cyclic structure such as a 5-membered ring and a 6-membered ring include heteromonocyclic compounds such as furan, thiophene, pyrrole, pyridine, oxazole, isoxazole, thiazole, isothiazole, furazan, imidazole, pyrazole, pyrazine, pyrimidine, pyridazine, pyrrolidine and piperidine; and condensed heterocyclic compounds such as benzofuran, isobenzofuran, indole, isoindole, indolizine and carbazole.

Of those cations, chain or cyclic compounds containing a nitrogen element are especially preferable from the standpoints that they are industrially inexpensive and chemically or electrochemically stable.

Preferable examples of the cation containing a nitrogen element include alkyl ammoniums such as triethylammonium; imidazoliums such as 1-ethyl-3-methyl imidazolium and 1-butyl-3-methyl imidazolium; pyrrolidiniums such as 1-methyl-1-propyl pyrrolidinium; and piperidiniums such as methyl propyl piperidinium.

As the lithium salt which is dissolved as the supporting electrolyte of the non-aqueous electrolyte in the ionic liquid, any lithium salt can be used without particular limitations as long as it is usually used as an electrolyte for non-aqueous electrolyte. Examples of such a lithium salt include $LiPF_6$, $LiBF_4$, $LiClO_4$, $LiAsF_6$, $LiCF_3SO_3$, $LiC(CF_3SO_2)_3$, $LiN(CF_3SO_2)_2$(LiTFSI), $LiN(FSO_2)_2$(LiFSI) and $LiBC_4O_8$. Those lithium salts can be used in mixture of two or more kinds thereof. Above all, LiFSI and LiTFSI are preferable.

It is generally desirable that such lithium salt is contained in a concentration of from 0.1 to 2.0 moles/litter, and preferably from 0.3 to 1.0 mole/liter in the ionic liquid.

The separator which is used in the present invention is a nonwoven fabric comprising at least one member selected from an organic fiber such as a polyolefin fiber and an aramid fiber and a glass fiber.

The separator has a porosity of 70% or more, and preferably 80% or more and not more than 95%. Also, the separator preferably has an air permeability obtained by the Gurley test method of 200 sec/100 cc or less.

By combining the separator with the ionic liquid containing FSI anion, the liquid impregnation property of the ionic liquid into the separator is remarkably enhanced in comparison with that of conventional ones. Following this, internal resistance of the battery is significantly decreased, and output performance and cycle life performance of a lithium secondary battery using an ionic liquid for the electrolyte are enhanced.

Here, the porosity is a value calculated from an apparent density of the separator and a true density of the solid of a constituent material according to the following expression.

Porosity (%)=100−{(Apparent density of separator)/(True density of solid of material)}×100

Also, the Gurley air permeability as referred to herein is an air resistance by the Gurley test method as prescribed in JIS P8117.

As the separator, a wet-type sheet having a porosity of 85% or more which is made in paper-making process; and comprises 80% by mass or more of a glass fiber having a mean fiber diameter of 1 μm or less and less than 20% by mass of an organic component including a fibrillated organic fiber, wherein the glass fibers are bound to each other through entanglement of the fibrillated organic fiber is especially suitably used.

The fibrillated organic fiber is a fiber having a number of fibrils formed by very finely cleaving a single fiber in a fiber axis direction by an action of a shear force based beating or the like with using an apparatus for disaggregating a fiber, for example, a double disc refiner. It is preferable that the fibrillated organic fiber is one in which at least 50% by mass or more of fibers are fibrillated into a fiber diameter of 1 μm or less, and it is more preferable that one in which 100% by mass of fibers are fibrillated into a fiber diameter of 1 μm or less.

As the fibrillated organic fiber, a polyethylene fiber, a polypropylene fiber, a polyamide fiber, a cellulose fiber, a rayon fiber, an acrylic fiber and the like can be used.

The lithium secondary battery of the present invention can be formed into a cylindrical form, a coin form, a square form or other optional form. A basic constitution of the battery is the same regardless of the form, and the design can be changed depending on the purpose. The lithium secondary battery of the present invention can be obtained by, for example, in the case of a cylindrical form, winding a negative electrode obtained by coating a negative active material on a current collector for negative electrode and a positive electrode obtained by coating a positive active material on a current collector for positive electrode via a separator; housing the resulting wound body in a battery can; injecting a non-aqueous electrolyte thereinto; and hermetically sealing the can in a state of arranging an insulating plate up and down. In the case of applying the lithium secondary battery to a coin-type lithium secondary battery, a disc-shaped negative electrode, a separator, a disc-shaped positive electrode and a stainless steel plate are housed in a coin-type battery can in a laminated state; a non-aqueous electrolyte is injected thereinto; and the can is then hermetically sealed.

According to the present invention, with respect to problems caused by badness in battery operating environment or internal temperature elevation during an accident, such as short circuit, ignition or explosion of battery, the use of a flame-retardant ionic liquid makes it possible to provide a battery with excellent safety, which is free from a danger of ignition or explosion even at the generation of heat at the time of overcharge or at the time of short circuit.

Also, in view of the fact that an impregnation property of an ionic liquid into the surface of a separator is improved, it becomes possible to significantly lower charge transfer resistance of the battery in the case of using an ionic liquid for the electrolyte. As a result, the output performance and cycle life performance of the battery are enhanced.

EXAMPLES

Although the present invention is more specifically described below by reference to the following Examples and Comparative Examples, it should not be construed that the present invention is limited to those Examples and Comparative Examples.

Example 1

Preparation of Positive Electrode

By a planetary mixer, 100 g of $LiMm_{1/3}Ni_{1/3}Co_{1/3}O_2$ as a positive active material, 7.8 g of carbon black (Super-P, manufactured by TIMCAL Graphite & Carbon Inc.) as a conductive agent, 3.3 g of polyvinylidene fluoride (PVDF) as a binder and 87.3 g of N-methyl-2-pyrrolidone (NMP) as a dispersion medium were respectively mixed to prepare a coating liquid for positive electrode having a solid content of 56%. This coating liquid was coated on an aluminum foil having a thickness of 20 μm by a coater and then dried at 130° C., followed by conducting a roll press treatment to obtain a positive electrode having a positive active material weight of 4 mg/cm$^2$.

Preparation of Negative Electrode

By a planetary mixer, 100 g of graphite (OMAC-1H, manufactured by Osaka Gas Chemicals Co., Ltd.) as a negative active material, 0.55 g of carbon black (Super-P, manufactured by TIMCAL Graphite & Carbon Inc.) as a conductive agent, 8.7 g of PVDF as a binder and 79.1 g of NMP as a dispersion medium were respectively mixed to prepare a coating liquid for negative electrode having a solid content of 58%. This coating liquid was coated on an electrolytic copper foil having a thickness of 10 μm by a coater and then dried at 130° C., followed by conducting a roll press treatment to obtain a negative electrode having a negative active material weight of 2 mg/cm$^2$.

Preparation of Lithium Secondary Battery

A laminate having a structure in which a wet-type separator made in paper-making process (040A02, manufactured by Nippon Sheet Glass Co., Ltd.; thickness: 42 μm) containing 80% by mass or more of an inorganic fiber and less than 20% by mass of an organic component including a fibrillated organic fiber was interposed between the thus obtained positive electrode and negative electrode was prepared. After welding a tab lead for extracting a terminal therewith, the resulting laminate was put into a folded aluminum laminate packaging material to prepare a lithium secondary battery having a positive electrode area of 18 cm$^2$ and a negative electrode area of 19.84 cm$^2$. A solution wherein 1.2 moles/kg of LiTFSI was dissolved in an ethyl methyl imidazolium (EMIm)/FSI solvent was injected as an electrolyte thereinto, and the opened aluminum laminate was sealed by a heat sealer to preparing a cell for test.

With respect to the thus prepared lithium secondary battery, a performance test at 20° C. was carried out. A test method is described below.

Performance Test

In order to measure discharge capacity, the batteries were firstly charged with a constant current of 15 mA/g to 4.2V, followed by holding the voltage at 4.2V until total charging time reached 17 hours or the current dropped to 0.3 mA/g, and then the batteries were discharged at 15 mA/g to a cut-off voltage of 2.7V at 25° C.

Using a charge and discharge test device, charge was carried out under a condition at a hour rate of 0.2 C, and discharge was carried out under a condition at a hour rate of from 0.2 C to 5 C, in order to confirm a capacity retention rate of the 5 C discharge capacity to the 0.2 C discharge capacity. Here, the C/n rate refers to the current density required to fully charge or discharge the batteries in n hours. The results are shown in Table 1.

Examples 2 to 22 and Comparative Examples 1 to 13

Cells for test were prepared in the same manner as in Example 1, except for using the battery materials such as the positive active material, the separator and the like, which are shown in Tables 1 and 2, respectively; and evaluated in the same manner. The results are also shown in Tables 1 and 2 together. A product name of the separator and the like which are used in each of the Examples and Comparative Examples are shown in Table 3. The term "inorganic filler" shown as the separator material in Tables 1 to 3 refers to a silica fine powder.

TABLE 1

| | Positive active material | Positive electrode weight [mg/cm$^2$] | Negative active material | Negative electrode weight [mg/cm$^2$] | Separator material | Thickness [μm] |
|---|---|---|---|---|---|---|
| Example 1 | LiMn$_{1/3}$Ni$_{1/3}$Co$_{1/3}$O$_2$ | 4 | Natural graphite (OMAC-1H) | 2 | Polyolefin + Inorganic filler | 42 |
| Example 2 | LiMn$_{1/3}$Ni$_{1/3}$Co$_{1/3}$O$_2$ | 4 | Natural graphite (OMAC-1H) | 2 | Polyolefin + Inorganic filler | 73 |
| Example 3 | LiMn$_{1/3}$Ni$_{1/3}$Co$_{1/3}$O$_2$ | 4 | Natural graphite (OMAC-1H) | 2 | Glass paper | 100 |
| Example 4 | LiMn$_{1/3}$Ni$_{1/3}$Co$_{1/3}$O$_2$ | 5.5 | Natural graphite (OMAC-1H) | 3 | Polyolefin + Inorganic filler | 42 |
| Example 5 | LiMn$_2$O$_4$ | 5.5 | Natural graphite (OMAC-1H) | 3 | Polyolefin + Inorganic filler | 42 |
| Example 6 | LiNi$_{0.8}$Co$_{0.15}$Al$_{0.05}$O$_2$ | 5.5 | Natural graphite (OMAC-1H) | 3 | Polyolefin + Inorganic filler | 42 |
| Example 7 | LiFePO$_4$ | 5.5 | Natural graphite (OMAC-1H) | 3 | Polyolefin + Inorganic filler | 42 |
| Example 8 | LiMn$_{1/3}$Ni$_{1/3}$Co$_{1/3}$O$_2$ | 5.5 | Natural graphite (OMAC-1H) | 3 | Glass paper | 100 |
| Example 9 | LiMn$_2$O$_4$ | 5.5 | Natural graphite (OMAC-1H) | 3 | Glass paper | 100 |
| Example 10 | LiNi$_{0.8}$Co$_{0.15}$Al$_{0.05}$O$_2$ | 5.5 | Natural graphite (OMAC-1H) | 3 | Glass paper | 100 |
| Example 11 | LiFePO$_4$ | 5.5 | Natural graphite (OMAC-1H) | 3 | Glass paper | 100 |
| Example 12 | LiMn$_{1/3}$Ni$_{1/3}$Co$_{1/3}$O$_2$ | 5.5 | Natural graphite (OMAC-1H) | 3 | Polyolefin + Inorganic filler | 73 |
| Example 13 | LiMn$_{1/3}$Ni$_{1/3}$Co$_{1/3}$O$_2$ | 5.5 | Natural graphite (OMAC-1H) | 3 | Polyolefin + Inorganic filler | 42 |
| Example 14 | LiMn$_{1/3}$Ni$_{1/3}$Co$_{1/3}$O$_2$ | 5.5 | Hardly graphitized carbon (CARBOTRON PS(F)) | 3.2 | Polyolefin + Inorganic filler | 42 |
| Example 15 | LiMn$_{1/3}$Ni$_{1/3}$Co$_{1/3}$O$_2$ | 5.5 | Hardly graphitized carbon (CARBOTRON PS(F)) | 3.2 | Polyolefin + Inorganic filler | 73 |
| Example 16 | LiMn$_{1/3}$Ni$_{1/3}$Co$_{1/3}$O$_2$ | 5.5 | Hardly graphitized carbon (CARBOTRON PS(F)) | 3.2 | Glass paper | 100 |
| Example 17 | LiMn$_{1/3}$Ni$_{1/3}$Co$_{1/3}$O$_2$ | 5.5 | Natural graphite/Hardly graphitized carbon (50/50) | 3.2 | Polyolefin + Inorganic filler | 42 |
| Example 18 | LiMn$_{1/3}$Ni$_{1/3}$Co$_{1/3}$O$_2$ | 5.5 | Natural graphite/Hardly graphitized carbon (50/50) | 3.2 | Glass paper | 100 |
| Example 19 | LiMn$_{1/3}$Ni$_{1/3}$Co$_{1/3}$O$_2$ | 4.0 | Li$_4$Ti$_5$O$_{12}$ | 4.7 | Polyolefin + Inorganic filler | 42 |
| Example 20 | LiMn$_{1/3}$Ni$_{1/3}$Co$_{1/3}$O$_2$ | 4.0 | Li$_4$Ti$_5$O$_{12}$ | 4.7 | Glass paper | 100 |
| Example 21 | LiMn$_{1/3}$Ni$_{1/3}$Co$_{1/3}$O$_2$ | 5.5 | NiSi$_5$C$_6$ | 1.5 | Polyolefin + Inorganic filler | 42 |
| Example 22 | LiMn$_{1/3}$Ni$_{1/3}$Co$_{1/3}$O$_2$ | 5.5 | NiSi$_5$C$_6$ | 1.5 | Glass paper | 100 |

| | Air permeability [sec/100 cc] | Basis weight [g/m$^2$] | Porosity [%] | Solvent | Supporting salt | Discharge capacity per weight of positive active material [mAh/g] | Capacity retention rate, Q5C/Q0.2 C [%] |
|---|---|---|---|---|---|---|---|
| Example 1 | 140 | 13.5 | 79 | EMIm-FSI | LiTFSI | 124 | 83 |
| Example 2 | 70 | 16.0 | 87 | EMIm-FSI | LiTFSI | 115 | 90 |
| Example 3 | 0.8 | 15.1 | 90 | EMIm-FSI | LiTFSI | 142 | 89 |
| Example 4 | 140 | 13.5 | 79 | EMIm-FSI | LiTFSI | 122 | 55 |
| Example 5 | 140 | 13.5 | 79 | EMIm-FSI | LiTFSI | 97 | 81 |
| Example 6 | 140 | 13.5 | 79 | EMIm-FSI | LiTFSI | 119 | 48 |
| Example 7 | 140 | 13.5 | 79 | EMIm-FSI | LiTFSI | 115 | 77 |
| Example 8 | 0.8 | 15.1 | 90 | EMIm-FSI | LiTFSI | 142 | 66 |
| Example 9 | 0.8 | 15.1 | 90 | EMIm-FSI | LiTFSI | 122 | 87 |

TABLE 1-continued

| | | | | | | | |
|---|---|---|---|---|---|---|---|
| Example 10 | 0.8 | 15.1 | 90 | EMIm-FSI | LiTFSI | 147 | 61 |
| Example 11 | 0.8 | 15.1 | 90 | EMIm-FSI | LiTFSI | 130 | 81 |
| Example 12 | 70 | 16.0 | 87 | EMIm-FSI | LiTFSI | 111 | 70 |
| Example 13 | 140 | 13.5 | 79 | EMIm-FSI | LiFSI | 117 | 87 |
| Example 14 | 140 | 13.5 | 79 | EMIm-FSI | LiTFSI | 92 | 86 |
| Example 15 | 70 | 16.0 | 87 | EMIm-FSI | LiTFSI | 88 | 88 |
| Example 16 | 0.8 | 15.1 | 90 | EMIm-FSI | LiTFSI | 123 | 91 |
| Example 17 | 140 | 13.5 | 79 | EMIm-FSI | LiTFSI | 101 | 77 |
| Example 18 | 0.8 | 15.1 | 90 | EMIm-FSI | LiTFSI | 131 | 75 |
| Example 19 | 140 | 13.5 | 79 | EMIm-FSI | LiTFSI | 121 | 90 |
| Example 20 | 0.8 | 15.1 | 90 | EMIm-FSI | LiTFSI | 146 | 91 |
| Example 21 | 140 | 13.5 | 79 | EMIm-FSI | LiTFSI | 110 | 91 |
| Example 22 | 0.8 | 15.1 | 90 | EMIm-FSI | LiTFSI | 131 | 93 |

TABLE 2

| | Positive active material | Positive electrode weight [mg/cm$^2$] | Negative active material | Negative electrode weight [mg/cm$^2$] | Separator material | Thickness [μm] | Air permeability [sec/100 cc] |
|---|---|---|---|---|---|---|---|
| Comparative Example 1 | LiMn$_{1/3}$Ni$_{1/3}$Co$_{1/3}$O$_2$ | 5.5 | Natural graphite (OMAC-1H) | 3 | Poryolefin + Inorganic filler | 42 | 140 |
| Comparative Example 2 | LiMn$_{1/3}$Ni$_{1/3}$Co$_{1/3}$O$_2$ | 4 | Natural graphite (OMAC-1H) | 2 | Polyolefin | 25 | 200 |
| Comparative Example 3 | LiMn$_{1/3}$Ni$_{1/3}$Co$_{1/3}$O$_2$ | 4 | Natural graphite (OMAC-1H) | 2 | Ceramics | 30 | 15 |
| Comparative Example 4 | LiMn$_{1/3}$Ni$_{1/3}$Co$_{1/3}$O$_2$ | 5.5 | Natural graphite (OMAC-1H) | 3 | Ceramics | 30 | 15 |
| Comparative Example 5 | LiMn$_2$O$_4$ | 5.5 | Natural graphite (OMAC-IH) | 3 | Ceramics | 30 | 15 |
| Comparative Example 6 | LiNi$_{0.8}$Co$_{0.15}$Al$_{0.05}$O$_2$ | 5.5 | Natural graphite (OMAC-1H) | 3 | Ceramics | 30 | 15 |
| Comparative Example 7 | LiFePO$_4$ | 5.5 | Natural graphite (OMAC-IH) | 3 | Ceramics | 30 | 15 |
| Comparative Examples 8 | LiMn$_{1/3}$Ni$_{1/3}$Co$_{1/3}$O$_2$ | 5.5 | Natural graphite (OMAC-IH) | 3 | Polyolefin | 25 | 620 |
| Comparative Example 9 | LiMn$_{1/3}$Ni$_{1/3}$Co$_{1/3}$O$_2$ | 5.5 | Hardly graphitized carbon (CARBOTRON PS(F)) | 3.2 | Polyolefin | 25 | 200 |
| Comparative Example 10 | LiMn$_{1/3}$Ni$_{1/3}$Co$_{1/3}$O$_2$ | 5.5 | Natural graphite/Hardly graphitized carbon (50/50) | 3.2 | Polyolefin | 25 | 200 |
| Comparative Example 11 | LiMn$_{1/3}$Ni$_{1/3}$Co$_{1/3}$O$_2$ | 5.5 | Natural graphite/Hardly graphitized carbon (50/50) | 3.2 | Ceramics | 30 | 15 |
| Comparative Example 12 | LiMn$_{1/3}$Ni$_{1/3}$Co$_{1/3}$O$_2$ | 4 | Li$_4$Ti$_5$O$_{12}$ | 4.7 | Polyolefin | 25 | 200 |
| Comparative Example 13 | LiMn$_{1/3}$Ni$_{1/3}$Co$_{1/3}$O$_2$ | 4 | Li$_4$Ti$_5$O$_{12}$ | 4.7 | Ceramics | 30 | 15 |

| | Basis weight [g/m$^2$] | Porosity [%] | Solvent | Supporting salt | Discharge capacity per weight of positive active material [mAh/g] | Capacity retention rate. Q5C/Q0.2 C [%] |
|---|---|---|---|---|---|---|
| Comparative Example 1 | 13.5 | 79 | EMIm-TFSI | LiTFSI | 0 | 0 |
| Comparative Example 2 | 10.9 | 56 | EMIm-FSI | LiTFSI | 117 | 31 |
| Comparative Example 3 | 32.9 | 40 | EMIm-FSl | LiTFSI | 140 | 25 |
| Comparative Example 4 | 32.9 | 40 | EMIm-FSI | LiTFSI | 137 | 10 |
| Comparative Example 5 | 32.9 | 40 | EMIm-FSI | LiTFSI | 110 | 25 |
| Comparative Example 6 | 32.9 | 40 | EMIm-FSI | LiTFSI | 140 | 7 |
| Comparative Example 7 | 32.9 | 40 | EMIm-FSI | LiTFSI | 128 | 20 |

TABLE 2-continued

| | | | | | | |
|---|---|---|---|---|---|---|
| Comparative Examples 8 | 14.3 | 39 | EMIm-FSI | LiTFSI | 0 | 0 |
| Comparative Example 9 | 10.9 | 56 | EMIm-FSI | LiTFSI | 77 | 66 |
| Comparative Example 10 | 10.9 | 56 | EMIm-FSI | LiTFSI | 90 | 42 |
| Comparative Example 11 | 32.9 | 40 | EMIm-FSI | LiTFSI | 120 | 43 |
| Comparative Example 12 | 10.9 | 56 | EMIm-FSI | LiTFSI | 121 | 38 |
| Comparative Example 13 | 32.9 | 40 | EMIm-FSI | LiTFSI | 146 | 30 |

TABLE 3

| | Manufacturer | Product name | Material |
|---|---|---|---|
| Example 1 | Nippon Sheet Glass | 040A02 | Polyolefin + Inorganic filler |
| Example 2 | Nippon Sheet Glass | 075E02 | Polyolefin + Inorganic filler |
| Example 3 | Nippon Sheet Glass | TGP-010A | Glass paper |
| Example 4 | Nippon Sheet Glass | 040A02 | Polyolefin + Inorganic filler |
| Example 5 | Nippon Sheet Glass | 040A02 | Polyolefin + Inorganic filler |
| Example 6 | Nippon Sheet Glass | 040A02 | Polyolefin + Inorganic filler |
| Example 7 | Nippon Sheet Glass | 040A02 | Polyolefin + Inorganic filler |
| Example 8 | Nippon Sheet Glass | TGP-010A | Glass paper |
| Example 9 | Nippon Sheet Glass | TGP-010A | Glass paper |
| Example 10 | Nippon Sheet Glass | TGP-010A | Glass paper |
| Example 11 | Nippon Sheet Glass | TGP-010A | Glass paper |
| Example 12 | Nippon Sheet Glass | 075E02 | Polyolefin + Inorganic filler |
| Example 13 | Nippon Sheet Glass | 040A02 | Polyolefin + Inorganic filler |
| Example 14 | Nippon Sheet Glass | 040A02 | Polyolefin + Inorganic filler |
| Example 15 | Nippon Sheet Glass | 075E02 | Polyolefin + Inorganic filler |
| Example 16 | Nippon Sheet Glass | TGP-010A | Glass paper |
| Example 17 | Nippon Sheet Glass | 040A02 | Polyolefin + Inorganic filler |
| Example 18 | Nippon Sheet Glass | TGP-010A | Glass paper |
| Example 19 | Nippon Sheet Glass | 040A02 | Polyolefin + Inorganic filler |
| Example 20 | Nippon Sheet Glass | TGP-010A | Glass paper |
| Example 21 | Nippon Sheet Glass | 040A02 | Polyolefin + Inorganic filler |
| Example 22 | Nippon Sheet Glass | TGP-010A | Glass paper |
| Comparative Example 1 | Nippon Sheet Glass | 040A02 | Polyolefin + Inorganic filler |
| Comparative Example 2 | Celgard | Celgard 3501 | Polyolefin |
| Comparative Example 3 | Evonik | Separion 240P030 | Ceramics |
| Comparative Example 4 | Evonik | Separion 240P030 | Ceramics |
| Comparative Example 5 | Evonik | Separion 240P030 | Ceramics |
| Comparative Example 6 | Evonik | Separion 240P030 | Ceramics |
| Comparative Example 7 | Evonik | Separion 240P030 | Ceramics |
| Comparative Example 8 | Celgard | Celgard 2325 | Polyolefin |
| Comparative Example 9 | Celgard | Celgard 3501 | Polyolefin |
| Comparative Example 10 | Celgard | Celgard 3501 | Polyolefin |
| Comparative Example 11 | Evonik | Separion 240P030 | Ceramics |
| Comparative Example 12 | Celgard | Celgard 3501 | Polyolefin |
| Comparative Example 13 | Evonik | Separion 240P030 | Ceramics |

As is clear from comparison of the results shown in Tables 1 and 2, in Comparative Example 1 in which FSI is not used for the electrolyte and Comparative Examples 2 to 13 in which the porosity of the separator is less than 70%, either or both of the discharge capacity and the capacity retention rate are inferior.

The lithium battery of the present invention can be used for various portable devices such as a mobile phone, a laptop personal computer, a personal digital assistant (PDA), a video camera and a digital camera. Furthermore, the lithium battery of the present invention is also useful for middle-sized or large-sized lithium batteries to be mounted in electrically power assisted bicycles or electric vehicles.

Although the present invention has been described in detail with reference to specific examples in the foregoing, it is apparent to person skilled in the art that it is possible to add various alterations and modifications insofar as the alterations and the modifications do not deviate from the sprit and scope of the present invention.

This patent application is based on Japanese Patent Application No. 2009-139074 filed on Jun. 10, 2009, and the contents thereof are incorporated herein by reference.

What is claimed is:

1. A lithium secondary battery comprising:
a positive electrode;
a negative electrode;
a separator provided between said positive electrode and said negative electrode; and
a non-aqueous electrolyte containing a lithium salt, wherein said non-aqueous electrolyte includes, as a solvent, an ionic liquid containing a bis(fluorosulfonyl) imide anion as an anion component and the separator is a nonwoven fabric comprising an organic fiber and a glass fiber and has a porosity of 80% or more and 95% or less, and more than 80% of the mass of the separator comprises said glass fiber and less than 20% of the mass of the separator comprises said organic fiber.

2. The lithium secondary battery according to claim 1, wherein the separator has an air permeability obtained by the Gurley test method of 200 sec/100 cc or less.

3. The lithium secondary battery according to claim 1, wherein the separator has the porosity of 85% and 95%.

4. The lithium secondary battery according to claim 3, wherein the separator is a wet-type sheet which is made in paper-making process and includes one or more glass fibers having a mean fiber diameter of 1 μm or less and less than 20% by mass of an organic component including a fibrillated organic fiber, wherein the glass fibers are bound to each other through entanglement of the fibrillated organic fiber.

5. A lithium secondary battery comprising:
a positive electrode;
a negative electrode;
a separator provided between said positive electrode and said negative electrode; and
a non-aqueous electrolyte, wherein the non-aqueous electrolyte includes, as a solvent, an ionic liquid containing a bis(fluorosulfonyl) imide anion as an anion component and said separator has a porosity of between 85% and 95%, inclusive, and more than 80% of the mass of the separator includes glass fiber and less than 20% of the mass of the separator comprises said organic fiber.

6. A lithium secondary battery comprising:
a positive electrode;
a negative electrode;
a separator provided between said positive electrode and said negative electrode; and
a non-aqueous electrolyte containing a lithium salt, wherein said non-aqueous electrolyte includes, as a solvent, an ionic liquid containing a bis(fluorosulfonyl) imide anion as an anion component and the separator is a nonwoven fabric including at least one member selected from an organic fiber and a glass fiber and has a porosity between 85% and 95%, inclusive, and more than 80% of the mass of the separator includes said glass fiber and less than 20% of the mass of the separator comprises said organic fiber.

* * * * *